United States Patent
Zhang et al.

(10) Patent No.: US 10,236,026 B1
(45) Date of Patent: Mar. 19, 2019

(54) THERMAL BARRIER LAYERS AND SEED LAYERS FOR CONTROL OF THERMAL AND STRUCTURAL PROPERTIES OF HAMR MEDIA

(71) Applicant: WD Media, LLC, San Jose, CA (US)

(72) Inventors: Rui Zhang, Milpitas, CA (US); Tomoko Seki, Sunnyvale, CA (US); Antony Ajan, San Jose, CA (US); Paul C. Dorsey, Los Altos, CA (US)

(73) Assignee: WD MEDIA, LLC, San Jose, CA (US)

( * ) Notice: Subject to any disclaimer, the term of this patent is extended or adjusted under 35 U.S.C. 154(b) by 162 days.

(21) Appl. No.: 14/935,337

(22) Filed: Nov. 6, 2015

(51) Int. Cl.
| | | |
|---|---|---|
| *G11B 5/738* | (2006.01) | |
| *G11B 5/84* | (2006.01) | |
| *G11B 5/64* | (2006.01) | |
| *G11B 5/73* | (2006.01) | |
| *G11B 5/00* | (2006.01) | |
| *G11B 5/012* | (2006.01) | |

(52) U.S. Cl.
CPC ............. *G11B 5/738* (2013.01); *G11B 5/64* (2013.01); *G11B 5/7325* (2013.01); *G11B 5/8408* (2013.01); *G11B 5/012* (2013.01); *G11B 2005/0021* (2013.01)

(58) Field of Classification Search
None
See application file for complete search history.

(56) References Cited

U.S. PATENT DOCUMENTS

| | | |
|---|---|---|
| 6,013,161 A | 1/2000 | Chen et al. |
| 6,063,248 A | 5/2000 | Bourez et al. |
| 6,068,891 A | 5/2000 | O'Dell et al. |
| 6,086,730 A | 7/2000 | Liu et al. |
| 6,099,981 A | 8/2000 | Nishimori |
| 6,103,404 A | 8/2000 | Ross et al. |
| 6,117,499 A | 9/2000 | Wong et al. |
| 6,136,403 A | 10/2000 | Prabhakara et al. |
| 6,143,375 A | 11/2000 | Ross et al. |
| 6,145,849 A | 11/2000 | Bae et al. |
| 6,146,737 A | 11/2000 | Malhotra et al. |
| 6,149,696 A | 11/2000 | Jia |
| 6,150,015 A | 11/2000 | Bertero et al. |
| 6,156,404 A | 12/2000 | Ross et al. |
| 6,159,076 A | 12/2000 | Sun et al. |
| 6,164,118 A | 12/2000 | Suzuki et al. |
| 6,200,441 B1 | 3/2001 | Gomicki et al. |
| 6,204,995 B1 | 3/2001 | Hokkyo et al. |
| 6,206,765 B1 | 3/2001 | Sanders et al. |
| 6,210,819 B1 | 4/2001 | Lal et al. |
| 6,216,709 B1 | 4/2001 | Fung et al. |

(Continued)

*Primary Examiner* — Brian M Butcher
(74) *Attorney, Agent, or Firm* — Loza & Loza, LLP; Gabriel Fitch

(57) ABSTRACT

Thermal barrier layers and seed layers for control of thermal and structural properties of heat assisted magnetic recording (HAMR) media are provided. One such HAMR medium includes a substrate, a heat sink layer on the substrate, a thermal barrier layer of SrTiO₃ on the heat sink layer, an underlayer of MgO on the thermal barrier layer, and a magnetic recording layer on the underlayer. Another such HAMR medium includes a substrate, a heat sink layer on the substrate, a thermal barrier layer of an ABO3-type oxide on the heat sink layer, and a magnetic recording layer on the thermal barrier layer.

34 Claims, 7 Drawing Sheets

(56) References Cited

U.S. PATENT DOCUMENTS

| | | |
|---|---|---|
| 6,221,119 B1 | 4/2001 | Homola |
| 6,248,395 B1 | 6/2001 | Homola et al. |
| 6,261,681 B1 | 7/2001 | Suekane et al. |
| 6,270,885 B1 | 8/2001 | Hokkyo et al. |
| 6,274,063 B1 | 8/2001 | Li et al. |
| 6,283,838 B1 | 9/2001 | Blake et al. |
| 6,287,429 B1 | 9/2001 | Moroishi et al. |
| 6,290,573 B1 | 9/2001 | Suzuki |
| 6,299,947 B1 | 10/2001 | Suzuki et al. |
| 6,303,217 B1 | 10/2001 | Malhotra et al. |
| 6,309,765 B1 | 10/2001 | Suekane et al. |
| 6,358,636 B1 | 3/2002 | Yang et al. |
| 6,362,452 B1 | 3/2002 | Suzuki et al. |
| 6,363,599 B1 | 4/2002 | Bajorek |
| 6,365,012 B1 | 4/2002 | Sato et al. |
| 6,381,090 B1 | 4/2002 | Suzuki et al. |
| 6,381,092 B1 | 4/2002 | Suzuki |
| 6,387,483 B1 | 5/2002 | Hokkyo et al. |
| 6,391,213 B1 | 5/2002 | Homola |
| 6,395,349 B1 | 5/2002 | Salamon |
| 6,403,919 B1 | 6/2002 | Salamon |
| 6,408,677 B1 | 6/2002 | Suzuki |
| 6,426,157 B1 | 7/2002 | Hokkyo et al. |
| 6,429,984 B1 | 8/2002 | Alex |
| 6,482,330 B1 | 11/2002 | Bajorek |
| 6,482,505 B1 | 11/2002 | Bertero et al. |
| 6,500,567 B1 | 12/2002 | Bertero et al. |
| 6,528,124 B1 | 3/2003 | Nguyen |
| 6,548,821 B1 | 4/2003 | Treves et al. |
| 6,552,871 B2 | 4/2003 | Suzuki et al. |
| 6,565,719 B1 | 5/2003 | Lairson et al. |
| 6,566,674 B1 | 5/2003 | Treves et al. |
| 6,571,806 B2 | 6/2003 | Rosano et al. |
| 6,628,466 B2 | 9/2003 | Alex |
| 6,664,503 B1 | 12/2003 | Hsieh et al. |
| 6,670,055 B2 | 12/2003 | Tomiyasu et al. |
| 6,682,807 B2 | 1/2004 | Lairson et al. |
| 6,683,754 B2 | 1/2004 | Suzuki et al. |
| 6,730,420 B1 | 5/2004 | Bertero et al. |
| 6,743,528 B2 | 6/2004 | Suekane et al. |
| 6,759,138 B2 | 7/2004 | Tomiyasu et al. |
| 6,778,353 B1 | 8/2004 | Harper |
| 6,795,274 B1 | 9/2004 | Hsieh et al. |
| 6,855,232 B2 | 2/2005 | Jairson et al. |
| 6,857,937 B2 | 2/2005 | Bajorek |
| 6,893,748 B2 | 5/2005 | Bertero et al. |
| 6,899,959 B2 | 5/2005 | Bertero et al. |
| 6,916,558 B2 | 7/2005 | Umezawa et al. |
| 6,939,120 B1 | 9/2005 | Harper |
| 6,946,191 B2 | 9/2005 | Morikawa et al. |
| 6,967,798 B2 | 11/2005 | Homola et al. |
| 6,972,135 B2 | 12/2005 | Homola |
| 7,004,827 B1 | 2/2006 | Suzuki et al. |
| 7,006,323 B1 | 2/2006 | Suzuki |
| 7,016,154 B2 | 3/2006 | Nishihira |
| 7,019,924 B2 | 3/2006 | McNeil et al. |
| 7,045,215 B2 | 5/2006 | Shimokawa |
| 7,070,870 B2 | 7/2006 | Bertero et al. |
| 7,090,934 B2 | 8/2006 | Hokkyo et al. |
| 7,099,112 B1 | 8/2006 | Harper |
| 7,105,241 B2 | 9/2006 | Shimokawa et al. |
| 7,119,990 B2 | 10/2006 | Bajorek et al. |
| 7,147,790 B2 | 12/2006 | Wachenschwanz et al. |
| 7,161,753 B2 | 1/2007 | Wachenschwanz et al. |
| 7,166,319 B2 | 1/2007 | Ishiyama |
| 7,166,374 B2 | 1/2007 | Suekane et al. |
| 7,169,487 B2 | 1/2007 | Kawai et al. |
| 7,174,775 B2 | 2/2007 | Ishiyama |
| 7,179,549 B2 | 2/2007 | Malhotra et al. |
| 7,184,139 B2 | 2/2007 | Treves et al. |
| 7,196,860 B2 | 3/2007 | Alex |
| 7,199,977 B2 | 4/2007 | Suzuki et al. |
| 7,208,236 B2 | 4/2007 | Morikawa et al. |
| 7,220,500 B1 | 5/2007 | Tomiyasu et al. |
| 7,226,668 B2 | 6/2007 | Nagaraj et al. |
| 7,229,266 B2 | 6/2007 | Harper |
| 7,239,970 B2 | 7/2007 | Treves et al. |
| 7,252,897 B2 | 8/2007 | Shimokawa et al. |
| 7,277,254 B2 | 10/2007 | Shimokawa et al. |
| 7,281,920 B2 | 10/2007 | Homola et al. |
| 7,292,329 B2 | 11/2007 | Treves et al. |
| 7,301,726 B1 | 11/2007 | Suzuki |
| 7,302,148 B2 | 11/2007 | Treves et al. |
| 7,305,119 B2 | 12/2007 | Treves et al. |
| 7,314,404 B2 | 1/2008 | Singh et al. |
| 7,320,584 B1 | 1/2008 | Harper et al. |
| 7,329,114 B2 | 2/2008 | Harper et al. |
| 7,357,994 B2 | 4/2008 | Hazel et al. |
| 7,375,362 B2 | 5/2008 | Treves et al. |
| 7,420,886 B2 | 9/2008 | Tomiyasu et al. |
| 7,425,719 B2 | 9/2008 | Treves et al. |
| 7,471,484 B2 | 12/2008 | Wachenschwanz et al. |
| 7,498,062 B2 | 3/2009 | Calcaterra et al. |
| 7,531,485 B2 | 5/2009 | Hara et al. |
| 7,537,846 B2 | 5/2009 | Ishiyama et al. |
| 7,549,209 B2 | 6/2009 | Wachenschwanz et al. |
| 7,569,490 B2 | 8/2009 | Staud |
| 7,597,792 B2 | 10/2009 | Homola et al. |
| 7,597,973 B2 | 10/2009 | Ishiyama |
| 7,608,193 B2 | 10/2009 | Wachenschwanz et al. |
| 7,632,087 B2 | 12/2009 | Homola |
| 7,656,615 B2 | 2/2010 | Wachenschwanz et al. |
| 7,682,546 B2 | 3/2010 | Harper |
| 7,684,152 B2 | 3/2010 | Suzuki et al. |
| 7,686,606 B2 | 3/2010 | Harper et al. |
| 7,686,991 B2 | 3/2010 | Harper |
| 7,695,833 B2 | 4/2010 | Ishiyama |
| 7,722,968 B2 | 5/2010 | Ishiyama |
| 7,733,605 B2 | 6/2010 | Suzuki et al. |
| 7,736,768 B2 | 6/2010 | Ishiyama |
| 7,755,861 B1 | 7/2010 | Li et al. |
| 7,758,732 B1 | 7/2010 | Calcaterra et al. |
| 7,833,639 B2 | 11/2010 | Sonobe et al. |
| 7,833,641 B2 | 11/2010 | Tomiyasu et al. |
| 7,910,159 B2 | 3/2011 | Jung |
| 7,911,736 B2 | 3/2011 | Bajorek |
| 7,924,519 B2 | 4/2011 | Lambert |
| 7,944,165 B1 | 5/2011 | O'Dell |
| 7,944,643 B1 | 5/2011 | Jiang et al. |
| 7,955,723 B2 | 6/2011 | Umezawa et al. |
| 7,983,003 B2 | 7/2011 | Sonobe et al. |
| 7,993,497 B2 | 8/2011 | Moroishi et al. |
| 7,993,765 B2 | 8/2011 | Kim et al. |
| 7,998,912 B2 | 8/2011 | Chen et al. |
| 8,002,901 B1 | 8/2011 | Chen et al. |
| 8,003,237 B2 | 8/2011 | Sonobe et al. |
| 8,012,920 B2 | 9/2011 | Shimokawa |
| 8,038,863 B2 | 10/2011 | Homola |
| 8,057,926 B2 | 11/2011 | Ayama et al. |
| 8,062,778 B2 | 11/2011 | Suzuki et al. |
| 8,064,156 B1 | 11/2011 | Suzuki et al. |
| 8,076,013 B2 | 12/2011 | Sonobe et al. |
| 8,092,931 B2 | 1/2012 | Ishiyama et al. |
| 8,100,685 B1 | 1/2012 | Harper et al. |
| 8,101,054 B2 | 1/2012 | Chen et al. |
| 8,125,723 B1 | 2/2012 | Nichols et al. |
| 8,125,724 B1 | 2/2012 | Nichols et al. |
| 8,137,517 B1 | 3/2012 | Bourez |
| 8,142,916 B2 | 3/2012 | Umezawa et al. |
| 8,163,093 B1 | 4/2012 | Chen et al. |
| 8,171,949 B1 | 5/2012 | Lund et al. |
| 8,173,282 B1 | 5/2012 | Sun et al. |
| 8,178,480 B2 | 5/2012 | Hamakubo et al. |
| 8,206,789 B2 | 6/2012 | Suzuki |
| 8,218,260 B2 | 7/2012 | Iamratanakul et al. |
| 8,247,095 B2 | 8/2012 | Champion et al. |
| 8,257,783 B2 | 9/2012 | Suzuki et al. |
| 8,298,609 B1 | 10/2012 | Liew et al. |
| 8,298,689 B2 | 10/2012 | Sonobe et al. |
| 8,309,239 B2 | 11/2012 | Umezawa et al. |
| 8,316,668 B1 | 11/2012 | Chan et al. |
| 8,331,056 B2 | 12/2012 | O'Dell |
| 8,354,618 B1 | 1/2013 | Chen et al. |
| 8,367,228 B2 | 2/2013 | Sonobe et al. |

(56) References Cited

U.S. PATENT DOCUMENTS

| | | |
|---|---|---|
| 8,383,209 B2 | 2/2013 | Ayama |
| 8,394,243 B1 | 3/2013 | Jung et al. |
| 8,397,751 B1 | 3/2013 | Chan et al. |
| 8,399,809 B1 | 3/2013 | Bourez |
| 8,402,638 B1 | 3/2013 | Treves et al. |
| 8,404,056 B1 | 3/2013 | Chen et al. |
| 8,404,369 B2 | 3/2013 | Ruffini et al. |
| 8,404,370 B2 | 3/2013 | Sato et al. |
| 8,406,918 B2 | 3/2013 | Tan et al. |
| 8,414,966 B2 | 4/2013 | Yasumori et al. |
| 8,425,975 B2 | 4/2013 | Ishiyama |
| 8,431,257 B2 | 4/2013 | Kim et al. |
| 8,431,258 B2 | 4/2013 | Onoue et al. |
| 8,453,315 B2 | 6/2013 | Kajiwara et al. |
| 8,488,276 B1 | 7/2013 | Jung et al. |
| 8,491,800 B1 | 7/2013 | Dorsey |
| 8,492,009 B1 | 7/2013 | Homola et al. |
| 8,492,011 B2 | 7/2013 | Itoh et al. |
| 8,496,466 B1 | 7/2013 | Treves et al. |
| 8,517,364 B1 | 8/2013 | Crumley et al. |
| 8,517,657 B2 | 8/2013 | Chen et al. |
| 8,524,052 B1 | 9/2013 | Tan et al. |
| 8,530,065 B1 | 9/2013 | Chernyshov et al. |
| 8,546,000 B2 | 10/2013 | Umezawa |
| 8,551,253 B2 | 10/2013 | Na'im et al. |
| 8,551,627 B2 | 10/2013 | Shimada et al. |
| 8,556,566 B1 | 10/2013 | Suzuki et al. |
| 8,559,131 B2 | 10/2013 | Masuda et al. |
| 8,562,748 B1 | 10/2013 | Chen et al. |
| 8,565,050 B1 | 10/2013 | Bertero et al. |
| 8,570,844 B1 | 10/2013 | Yuan et al. |
| 8,580,410 B2 | 11/2013 | Onoue |
| 8,584,687 B1 | 11/2013 | Chen et al. |
| 8,591,709 B1 | 11/2013 | Lim et al. |
| 8,592,061 B2 | 11/2013 | Onoue et al. |
| 8,596,287 B1 | 12/2013 | Chen et al. |
| 8,597,723 B1 | 12/2013 | Jung et al. |
| 8,603,649 B2 | 12/2013 | Onoue |
| 8,603,650 B2 | 12/2013 | Sonobe et al. |
| 8,603,653 B2 | 12/2013 | Matsumoto et al. |
| 8,605,388 B2 | 12/2013 | Yasumori et al. |
| 8,605,555 B1 | 12/2013 | Chernyshov et al. |
| 8,608,147 B1 | 12/2013 | Yap et al. |
| 8,609,263 B1 | 12/2013 | Chernyshov et al. |
| 8,619,381 B2 | 12/2013 | Moser et al. |
| 8,623,528 B2 | 1/2014 | Umezawa et al. |
| 8,623,529 B2 | 1/2014 | Suzuki |
| 8,634,155 B2 | 1/2014 | Yasumori et al. |
| 8,658,003 B1 | 2/2014 | Bourez |
| 8,658,292 B1 | 2/2014 | Mallary et al. |
| 8,665,541 B2 | 3/2014 | Saito |
| 8,668,953 B1 | 3/2014 | Buechel-Rimmel |
| 8,674,327 B1 | 3/2014 | Poon et al. |
| 8,685,214 B1 | 4/2014 | Moh et al. |
| 8,696,404 B2 | 4/2014 | Sun et al. |
| 8,711,499 B1 | 4/2014 | Desai et al. |
| 8,743,666 B1 | 6/2014 | Bertero et al. |
| 8,758,912 B2 | 6/2014 | Srinivasan et al. |
| 8,787,124 B1 | 7/2014 | Chernyshov et al. |
| 8,787,130 B1 | 7/2014 | Yuan et al. |
| 8,791,391 B2 | 7/2014 | Bourez |
| 8,792,211 B2 | 7/2014 | Yuan et al. |
| 8,795,765 B2 | 8/2014 | Koike et al. |
| 8,795,790 B2 | 8/2014 | Sonobe et al. |
| 8,795,857 B2 | 8/2014 | Ayama et al. |
| 8,800,322 B1 | 8/2014 | Chan et al. |
| 8,811,129 B1 | 8/2014 | Yuan et al. |
| 8,817,410 B2 | 8/2014 | Moser et al. |
| 2002/0060883 A1 | 5/2002 | Suzuki |
| 2003/0022024 A1 | 1/2003 | Wachenschwanz |
| 2004/0022387 A1 | 2/2004 | Weikle |
| 2004/0132301 A1 | 7/2004 | Harper et al. |
| 2004/0202793 A1 | 10/2004 | Harper et al. |
| 2004/0202865 A1 | 10/2004 | Homola et al. |
| 2004/0209123 A1 | 10/2004 | Bajorek et al. |
| 2004/0209470 A1 | 10/2004 | Bajorek |
| 2005/0036223 A1 | 2/2005 | Wachenschwanz et al. |
| 2005/0142990 A1 | 6/2005 | Homola |
| 2005/0150862 A1 | 7/2005 | Harper et al. |
| 2005/0151282 A1 | 7/2005 | Harper et al. |
| 2005/0151283 A1 | 7/2005 | Bajorek et al. |
| 2005/0151300 A1 | 7/2005 | Harper et al. |
| 2005/0155554 A1 | 7/2005 | Saito |
| 2005/0167867 A1 | 8/2005 | Bajorek et al. |
| 2005/0263401 A1 | 12/2005 | Olsen et al. |
| 2006/0147758 A1 | 7/2006 | Jung et al. |
| 2006/0181697 A1 | 8/2006 | Treves et al. |
| 2006/0207890 A1 | 9/2006 | Staud |
| 2007/0070549 A1 | 3/2007 | Suzuki et al. |
| 2007/0231589 A1 | 10/2007 | Smeggil et al. |
| 2007/0245909 A1 | 10/2007 | Homola |
| 2008/0075845 A1 | 3/2008 | Sonobe et al. |
| 2008/0093760 A1 | 4/2008 | Harper et al. |
| 2009/0117408 A1 | 5/2009 | Umezawa et al. |
| 2009/0136784 A1 | 5/2009 | Suzuki et al. |
| 2009/0169922 A1 | 7/2009 | Ishiyama |
| 2009/0191331 A1 | 7/2009 | Umezawa et al. |
| 2009/0202866 A1 | 8/2009 | Kim et al. |
| 2009/0311557 A1 | 12/2009 | Onoue et al. |
| 2010/0143752 A1 | 6/2010 | Ishibashi et al. |
| 2010/0190035 A1 | 7/2010 | Sonobe et al. |
| 2010/0196619 A1 | 8/2010 | Ishiyama |
| 2010/0196740 A1 | 8/2010 | Ayama et al. |
| 2010/0209601 A1 | 8/2010 | Shimokawa et al. |
| 2010/0215992 A1 | 8/2010 | Horikawa et al. |
| 2010/0232065 A1 | 9/2010 | Suzuki et al. |
| 2010/0247965 A1 | 9/2010 | Onoue |
| 2010/0261039 A1 | 10/2010 | Itoh et al. |
| 2010/0279151 A1 | 11/2010 | Sakamoto et al. |
| 2010/0300884 A1 | 12/2010 | Homola et al. |
| 2010/0304186 A1 | 12/2010 | Shimokawa |
| 2011/0097603 A1 | 4/2011 | Onoue |
| 2011/0097604 A1 | 4/2011 | Onoue |
| 2011/0171495 A1 | 7/2011 | Tachibana et al. |
| 2011/0206947 A1 | 8/2011 | Tachibana et al. |
| 2011/0212346 A1 | 9/2011 | Onoue et al. |
| 2011/0223446 A1 | 9/2011 | Onoue et al. |
| 2011/0244119 A1 | 10/2011 | Umezawa et al. |
| 2011/0299194 A1 | 12/2011 | Aniya et al. |
| 2011/0311841 A1 | 12/2011 | Saito et al. |
| 2012/0069466 A1 | 3/2012 | Okamoto et al. |
| 2012/0070692 A1 | 3/2012 | Sato et al. |
| 2012/0077060 A1 | 3/2012 | Ozawa |
| 2012/0127599 A1 | 5/2012 | Shimokawa et al. |
| 2012/0127601 A1 | 5/2012 | Suzuki et al. |
| 2012/0129009 A1 | 5/2012 | Sato et al. |
| 2012/0140359 A1 | 6/2012 | Tachibana |
| 2012/0141833 A1 | 6/2012 | Umezawa et al. |
| 2012/0141835 A1 | 6/2012 | Sakamoto |
| 2012/0147718 A1* | 6/2012 | Hellwig .................. G11B 5/66 369/13.33 |
| 2012/0148875 A1 | 6/2012 | Hamakubo et al. |
| 2012/0156523 A1 | 6/2012 | Seki et al. |
| 2012/0164488 A1 | 6/2012 | Shin et al. |
| 2012/0170152 A1 | 7/2012 | Sonobe et al. |
| 2012/0171369 A1 | 7/2012 | Koike et al. |
| 2012/0175243 A1 | 7/2012 | Fukuura et al. |
| 2012/0189872 A1 | 7/2012 | Umezawa et al. |
| 2012/0196049 A1 | 8/2012 | Azuma et al. |
| 2012/0207919 A1 | 8/2012 | Sakamoto et al. |
| 2012/0214021 A1* | 8/2012 | Sayama et al. ............ 428/836.1 |
| 2012/0225217 A1 | 9/2012 | Itoh et al. |
| 2012/0251842 A1 | 10/2012 | Yuan et al. |
| 2012/0251846 A1 | 10/2012 | Desai et al. |
| 2012/0276417 A1 | 11/2012 | Shimokawa et al. |
| 2012/0308722 A1 | 12/2012 | Suzuki et al. |
| 2013/0040167 A1 | 2/2013 | Alagarsamy et al. |
| 2013/0071694 A1 | 3/2013 | Srinivasan et al. |
| 2013/0165029 A1 | 6/2013 | Sun et al. |
| 2013/0175252 A1 | 7/2013 | Bourez |
| 2013/0216865 A1 | 8/2013 | Yasumori et al. |
| 2013/0230647 A1 | 9/2013 | Onoue et al. |
| 2013/0314815 A1 | 11/2013 | Yuan et al. |
| 2014/0011054 A1 | 1/2014 | Suzuki |

(56) References Cited

U.S. PATENT DOCUMENTS

| | | |
|---|---|---|
| 2014/0043947 A1* | 2/2014 | Hohlfeld .............. G11B 5/3133 |
| | | 369/13.4 |
| 2014/0044992 A1 | 2/2014 | Onoue |
| 2014/0050843 A1 | 2/2014 | Yi et al. |
| 2014/0151360 A1 | 6/2014 | Gregory et al. |
| 2014/0234666 A1 | 8/2014 | Knigge et al. |
| 2014/0376350 A1 | 12/2014 | Cheng et al. |
| 2015/0004437 A1 | 1/2015 | Moriya |
| 2016/0358622 A1* | 12/2016 | Arora ..................... G11B 5/855 |

* cited by examiner

THERMAL BARRIER LAYERS AND SEED LAYERS FOR CONTROL OF THERMAL AND STRUCTURAL PROPERTIES OF HAMR MEDIA

BACKGROUND

Energy/Heat Assisted Magnetic Recording (EAMR/HAMR) systems can potentially increase the areal density of information recorded magnetically on various media. For example, to achieve magnetic information storage levels beyond 1 terabit per inch squared, smaller grain size media may be required. Such designs can demand higher Ku materials for a magnetic recording layer to sustain thermal stability, such as $L1_0$ ordered FePt alloys. The underlayer beneath the FePt magnetic recording layer is critical to the media design as it promotes ordering of the FePt magnetic recording layer, thereby affecting the texture and thermal properties of the media stack. Obtaining a high quality underlayer with good texture and a narrow rocking curve is important to achieve an FePt magnetic recording layer with acceptable recording performance.

HAMR media generally includes a heat sink positioned beneath the magnetic recording layer to dissipate heat and/or light energy from the magnetic recording layer. In addition, the introduction of a thermal barrier layer between the magnetic recording layer and the heat sink in HAMR media design has been demonstrated to improve the life-time of the recording head through laser power reduction. The inclusion of a thermal barrier layer may also have a positive impact on the signal-to-noise-ratio (SNR) of the system. However, most of the material candidates for thermal barriers are either amorphous or do not have the proper crystal structure to grow a high quality underlayer.

To address this problem, a seed layer for underlayer growth may be included in the HAMR media design. However, the addition of the seed layer not only complicates the structure of the HAMR media, but also reduces the effectiveness of the thermal barrier layer. Accordingly, an improved HAMR media structure that addresses these shortcomings is needed.

DETAILED DESCRIPTION

Figure 1:
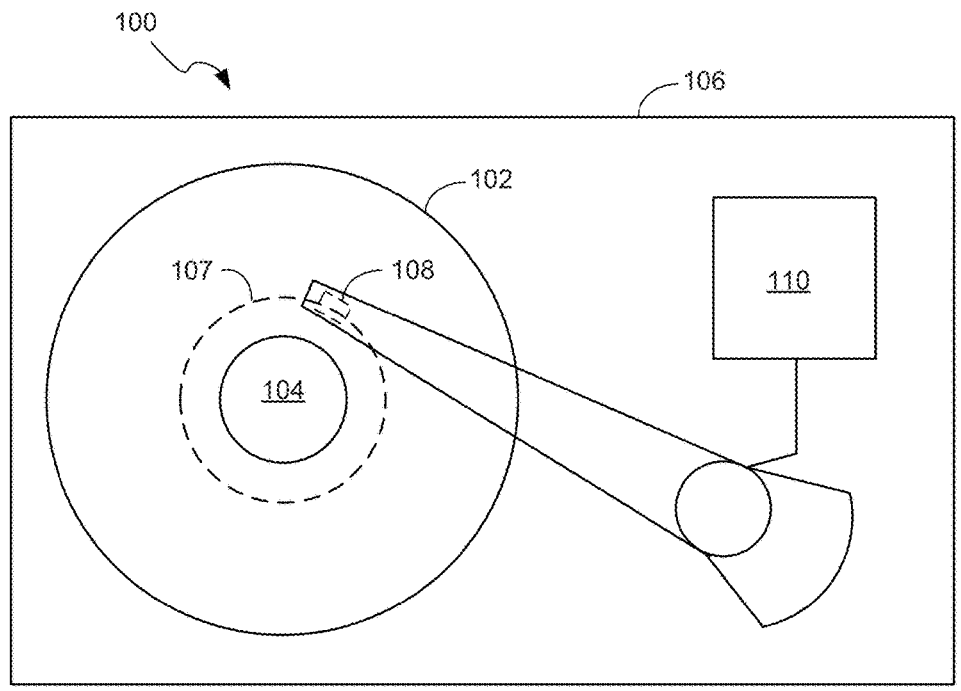
FIG. 1 is a top schematic view of a disk drive configured for heat assisted magnetic recording (HAMR) and including a magnetic medium with a thermal barrier layer in accordance with one embodiment of the invention.

Referring now to the drawings, embodiments of heat assisted magnetic recording (HAMR) media that include a magnetic recording layer, a thermal barrier layer and a heat sink are illustrated. One such HAMR media design utilizes an underlayer of MgO in between a thermal barrier layer of $SrTiO_3$ and the magnetic recording layer. The $SrTiO_3$ is used both as a seed to promote growth of high quality MgO and as a thermal barrier beneath the MgO. In an exemplary embodiment, the $SrTiO_3$ thermal barrier layer enables the MgO underlayer to be produced with good texture and a narrow rocking curve, thereby promoting $L1_0$ ordering of an FePt magnetic recording layer. In an aspect, the thermal barrier layer, heat sink layer and underlayer each have a cubic structure with (200) texture. In one embodiment, the thermal barrier layer and underlayer are deposited at a temperature greater than 450 degrees Celsius using respective radio frequency (RF) magnetron sputtering processes. In some embodiments, the thermal barrier layer is further deposited using a static magnet.

Another HAMR media design utilizes an ABO3-type oxide in between the magnetic recording layer and the heat sink. The ABO3-type oxide serves as both a thermal barrier layer and as an underlayer to promote $L1_0$ ordering of an FePt magnetic recording layer. In an aspect, the thermal barrier layer and heat sink layer each have a cubic structure with (200) texture. In one embodiment, the ABO3-type oxide may be $BaTiO_3$, $SrHfO_3$, $SrZrO_3$, $PbTiO_3$, $BaZrO_3$, or combinations thereof.

The terms "above," "over," "on," "below," "under," and "between" as used herein refer to a relative position of one layer with respect to other layers. As such, one layer deposited or disposed above, over, on, below, or under another layer may be directly in contact with the other layer or may have one or more intervening layers. Moreover, one layer deposited or disposed between layers may be directly in contact with the layers or may have one or more intervening layers.

It shall be appreciated by those skilled in the art in view of the present disclosure that although various exemplary fabrication methods are discussed herein with reference to magnetic recording disks, the methods, with or without some modifications, may be used for fabricating other types of recording disks, for example, optical recording disks such as a compact disc (CD) and a digital-versatile-disk (DVD), or magneto-optical recording disks, or ferroelectric data storage devices.

FIG. 1 is a top schematic view of a disk drive 100 configured for heat assisted magnetic recording (HAMR) and including a magnetic medium 102 with a thermal barrier layer (not shown in FIG. 1, but see FIG. 3) in accordance with one embodiment of the invention. The laser (not visible in FIG. 1, but see FIG. 2) is positioned with a head/slider 108. Disk drive 100 may include one or more disks/media 102 to store data. Disk/media 102 resides on a spindle assembly 104 that is mounted to drive housing 106. Data may be stored along tracks in the magnetic recording layer of disk 102. The reading and writing of data is accomplished with the head 108 that may have both read and write elements. The write element is used to alter the properties of the magnetic recording layer of disk 102 and thereby write information thereto. In one embodiment, head 104 may have magneto-resistive (MR), or giant magneto-resistive (GMR) elements. In another embodiment, head 104 may be another type of head, for example, an inductive read/write head or a Hall effect head.

In operation, a spindle motor (not shown) rotates the spindle assembly 104, and thereby rotates disk 102 to position head 108 at a particular location along a desired disk track. The position of head 104 relative to disk 102 may be controlled by position control circuitry 110.

Figure 2:
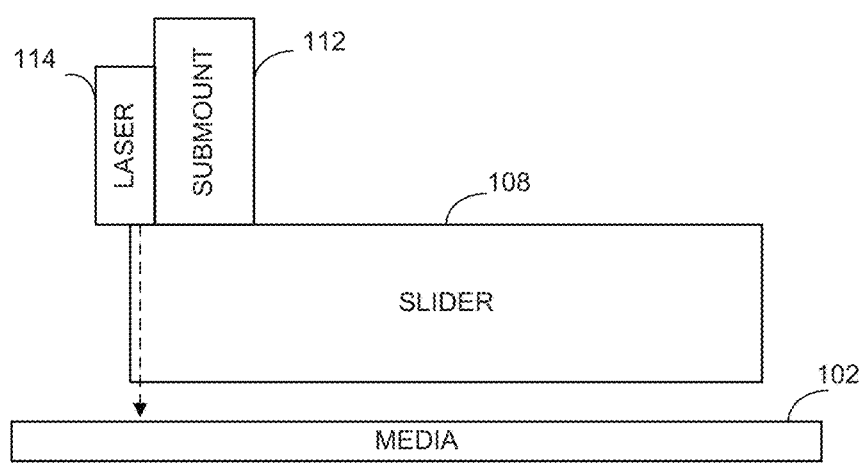
FIG. 2 is a side cross sectional schematic view of selected components of the HAMR system of FIG. 1 including the magnetic medium with the thermal barrier layer in accordance with one embodiment of the invention.

FIG. 2 is a side cross sectional schematic view of selected components of the HAMR system of FIG. 1 including the magnetic medium 102 with the thermal barrier layer (not shown in FIG. 2, but see FIG. 3) in accordance with one embodiment of the invention. The HAMR system components also include a sub-mount 112 attached to a top surface of the slider 108. A laser 114 is attached to the sub-mount 112, and possibly to the slider 108. The slider 108 includes the write element and the read element positioned along an air bearing surface (ABS) of the slider for writing information to, and reading information from, respectively, the media 102.

In operation, the laser 114 is configured to direct light energy to a waveguide in the slider 108 which directs the light to a near field transducer (NFT) near the air bearing surface (e.g., bottom surface) of the slider. Upon receiving the light from the laser via the waveguide, the NFT generates localized heat energy that heats a portion of the media 102 near the write element and the read element. FIGS. 1 and 2 illustrate a specific embodiment of a HAMR system. In other embodiments, the improved media with the thermal barrier layer can be used in other suitable HAMR systems.

Figure 3:
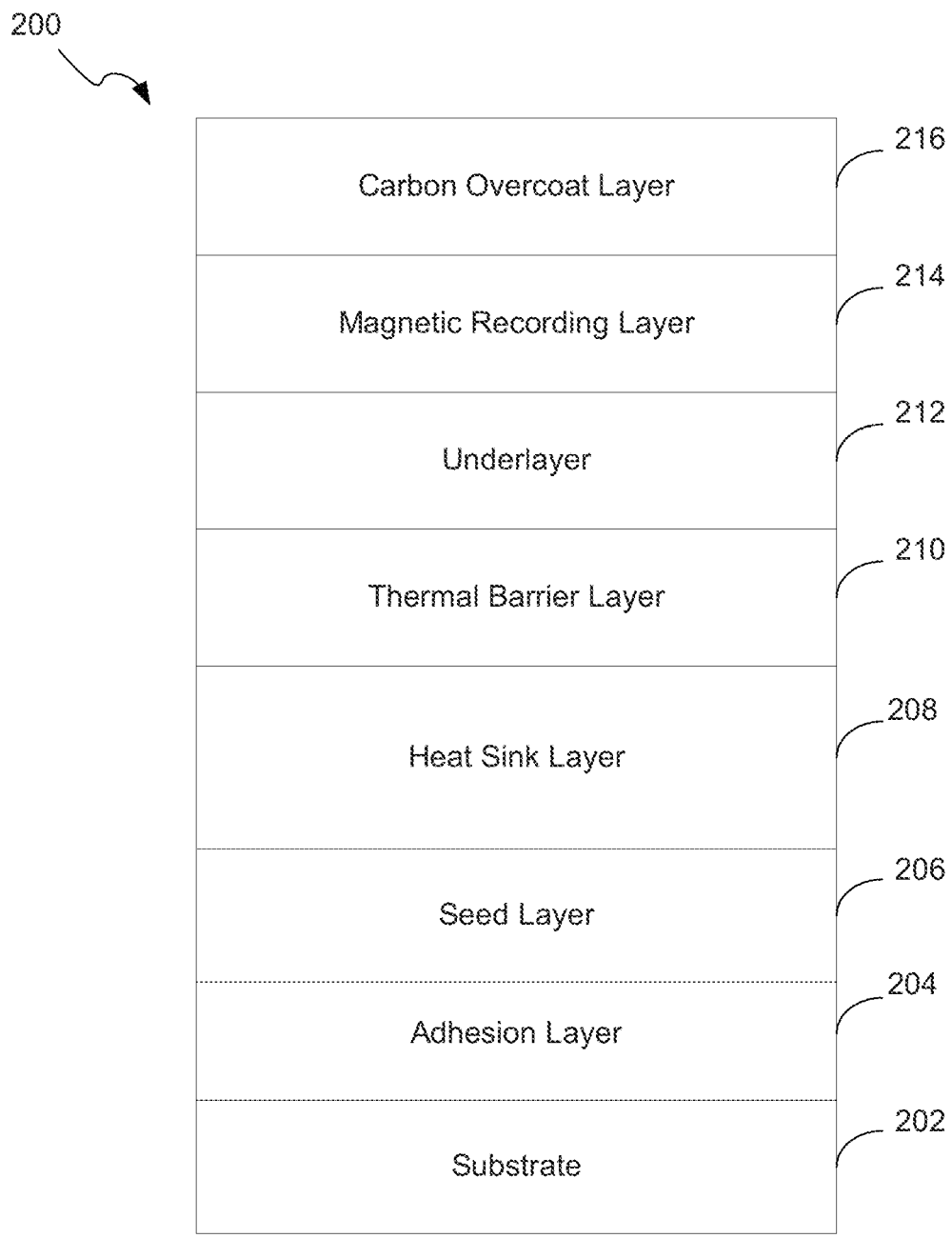
FIG. 3 is side cross sectional view of a HAMR medium having a thermal barrier layer and an underlayer in accordance with one embodiment of the invention.

FIG. 3 is side cross sectional view of a HAMR medium 200 having an underlayer 212 of MgO and a thermal barrier layer 210 of SrTiO$_3$ (STO) or similar crystalline oxide material in accordance with one embodiment of the invention. The medium 200 has a stacked structure with a glass substrate 202 at a bottom/base layer, an adhesion layer 204 on the glass substrate 202, a seed layer 206 on the adhesion layer 204, a heat sink layer 208 on the seed layer 206, the thermal barrier layer 210 on the heat sink layer 208, the underlayer 212 on the thermal barrier layer 210, a magnetic recording layer 214 on the underlayer 212, and a carbon overcoat layer 216 on the magnetic recording layer 214. In some embodiments, the adhesion layer 204, seed layer 206, and carbon overcoat layer 216 can be omitted from the medium structure.

In one embodiment, the substrate 202 can be made of one or more materials such as an Al alloy, NiP plated Al, glass, glass ceramic, and/or combinations thereof. In one embodiment, the adhesion layer 204 can includes one or more materials such as CrTi, CrTa, NiTa, CoCrTaZr, CoFeZrBCr, CoTaZr, CoFeTaZr, CoCrWTaZr, CoCrMoTaZr, CoZr-WMo, combinations thereof, and/or other suitable materials known in the art.

In one embodiment, the seed layer 206 can be made of one or more materials such as RuAl, CrTa, NiTa, combinations thereof, and/or other suitable materials known in the art. In one embodiment, the heat sink layer 208 can be made of one or more materials such as Ag, Al, Au, Cu, Cr, Mo, Ru, W, CuZr, MoCu, AgPd, CrRu, CrV, CrW, CrMo, CrNd, combinations thereof, and/or other suitable materials known in the art.

In one embodiment, the magnetic recording layer 214 can be made of one or more materials such as FePt and/or other suitable materials known in the art. In addition, the magnetic recording layer 214 may further include one or more segregants, such as carbon. In an exemplary embodiment, the magnetic recording layer 214 includes L1$_o$ phase FePt.

In several embodiments, the thermal conductivity ($\kappa$) of the thermal barrier layer 210 is less than the thermal conductivity of the underlayer 212. In one embodiment, the bulk thermal conductivity of SrTiO$_3$ is about 11.2 Watts per meter Kelvin (W/mK), whereas the bulk thermal conductivity of MgO is between 45 W/mK and 60 W/mK. In thin film form, the thermal conductivity of SrTiO$_3$ may be about 1.5 W/mK, whereas the thermal conductivity of MgO may be about 10 W/mK.

In several embodiments, the thermal barrier layer 210 is configured to (e.g., the materials for the first thermal barrier layer are selected to) facilitate a heat transfer from the magnetic recording layer 214 to the heat sink layer 208, and impede a heat transfer from the heat sink layer 208 to the magnetic recording layer 214. In a number of embodiments, the thermal barrier layer 210 is deposited at high temperature using a radio frequency (RF) magnetron sputtering process. In one embodiment, the thermal barrier layer 210 is deposited at a temperature greater than 450 degrees Celsius (° C.). In some embodiments, the thermal barrier layer 210 is deposited using a static magnet.

In further embodiments, the underlayer 212 is also deposited at high temperature using an RF magnetron sputtering process. In one embodiment, the underlayer 212 is deposited at a temperature greater than 450° C. For example, the thermal barrier layer 210 may be deposited at a temperature greater than 450° C., and the underlayer 212 may then be deposited on the thermal barrier layer 210 without cooling of the thermal barrier layer 210.

In several embodiments, the thermal barrier layer 210 of SrTiO$_3$ is used as a seed to promote growth of a high quality MgO underlayer 212. In an exemplary embodiment, the SrTiO$_3$ thermal barrier layer 210 enables the MgO underlayer 212 to be produced with good texture and a narrow rocking curve, thereby promoting good L1$_0$ ordering and low RC-FWHM of an FePt magnetic recording layer 214. In one embodiment, the MgO underlayer 212 grown on the SrTiO$_3$ thermal barrier layer 210 has a cubic structure (cubic crystal structure) with (200) texture. In an exemplary embodiment, an SrTiO$_3$ thermal barrier layer 210 having a cubic structure with (200) texture is deposited on the heat sink layer 208 as a seed to grow the MgO underlayer 212 with (200) texture.

In further embodiments, the heat sink layer 208 also has a cubic structure with (200) texture and the lattice mismatching between the heat sink layer 208 and the thermal barrier layer 210 is less than eight (8) percent. In an exemplary embodiment, the heat sink layer 208 includes W, Mo, Cr or a Cr-based alloy to achieve the desired lattice mismatching. For example, the heat sink layer 208 may include CrW or CrMo. In addition, in embodiments in which the heat sink layer 208 includes W, Cr and their alloys, a (200) textured heat sink layer 208 may be grown using a seed layer 206 including a textured layer of RuAl over an amorphous layer of CrTa. In embodiments in which the heat sink layer 208 includes Cr and its alloys, a (200) textured heat sink layer 208 may be grown using a seed layer 206 including an amorphous layer of NiTa.

In several embodiments, the thickness of the thermal barrier layer 210 is between about 3 nm and about 10 nm and the thickness of the underlayer 219 is between about 2 nm and about 11 nm. In an exemplary embodiment, the thickness of the thermal barrier layer 210 is about 7 nm and the thickness of the underlayer 212 is about 3 nm.

Figure 4:
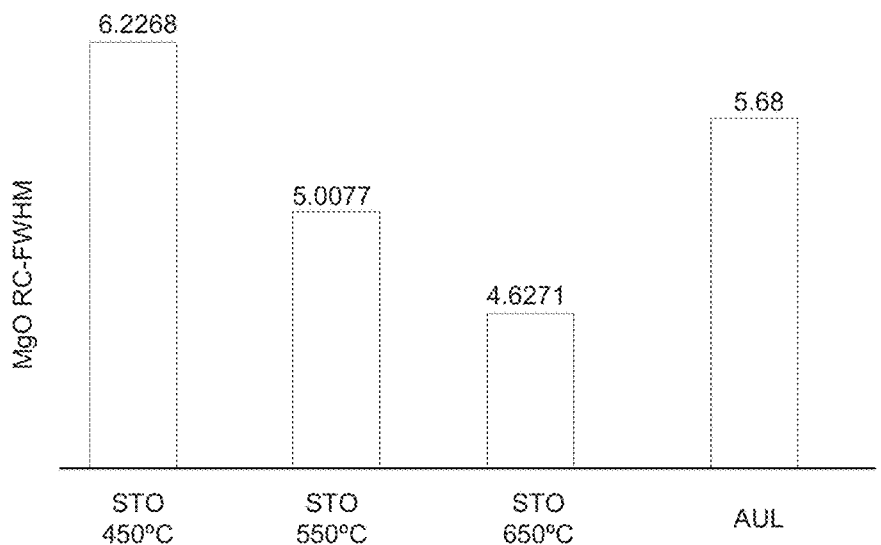
FIG. 4 illustrates exemplary rocking curve full width half maximum (RC-FWHM) for MgO at various deposition temperatures of $SrTiO_3$ (STO) compared against an amorphous underlayer (AUL) in accordance with one embodiment of the invention.

FIG. 4 illustrates exemplary rocking curve full width half maximum (RC-FWHM) for MgO at various deposition temperatures of SrTiO$_3$ (STO) compared against an amorphous underlayer (AUL) in accordance with one embodiment of the invention. As can be seen in FIG. 4, as the deposition temperature of SrTiO$_3$ increases from 450° C. to 650° C., the RC-FWHM of MgO desirably decreases from 6.2268 to 4.6271, indicating a higher quality of film. This can be compared with an MgO RC-FWHM of 5.68 when deposited over an AUL. The RC-FWHM of MgO when deposited over SrTiO$_3$ at a deposition temperature of 450° C. is comparable to the RC-FWIHM of MgO when deposited over an AUL. In addition, the RC-FWHM of MgO when deposited over SrTiO$_3$ at a deposition temperature greater than 450° C. (e.g., at 550° C. and 650° C.) is improved with respect to MgO deposited over AUL, indicating that MgO deposited over SrTiO$_3$ at deposition temperatures greater than 450° C. has a higher quality than MgO deposited over AUL.

Figure 5:
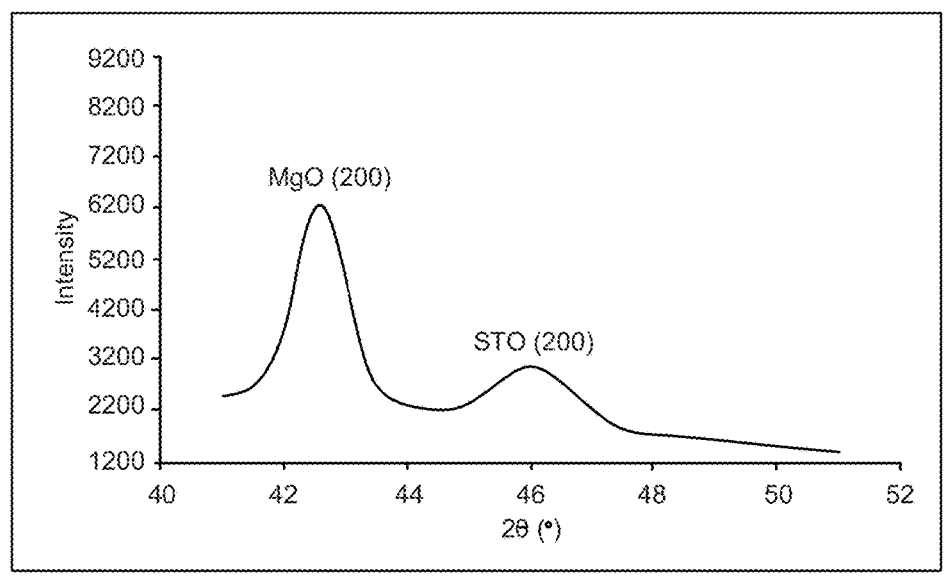
FIG. 5 illustrates an exemplary X-ray diffraction (XRD) pattern of MgO deposited over $SrTiO_3$ (STO) at a temperature of 650° C. in accordance with one embodiment of the invention.

FIG. 5 illustrates an exemplary X-ray diffraction (XRD) pattern of MgO deposited over SrTiO$_3$ (STO) at a temperature of 650° C. in accordance with one embodiment of the invention. An XRD scan involves measuring the intensity over a range of angles of the detector (2θ). As can be seen in FIG. 5, a pronounced peak of MgO (200) appears in the XRD pattern, indicating a high quality MgO layer when deposited over SrTiO$_3$ at high temperature. In addition, the SrTiO$_3$ (200) peak can also be observed from FIG. 5.

Figure 6:
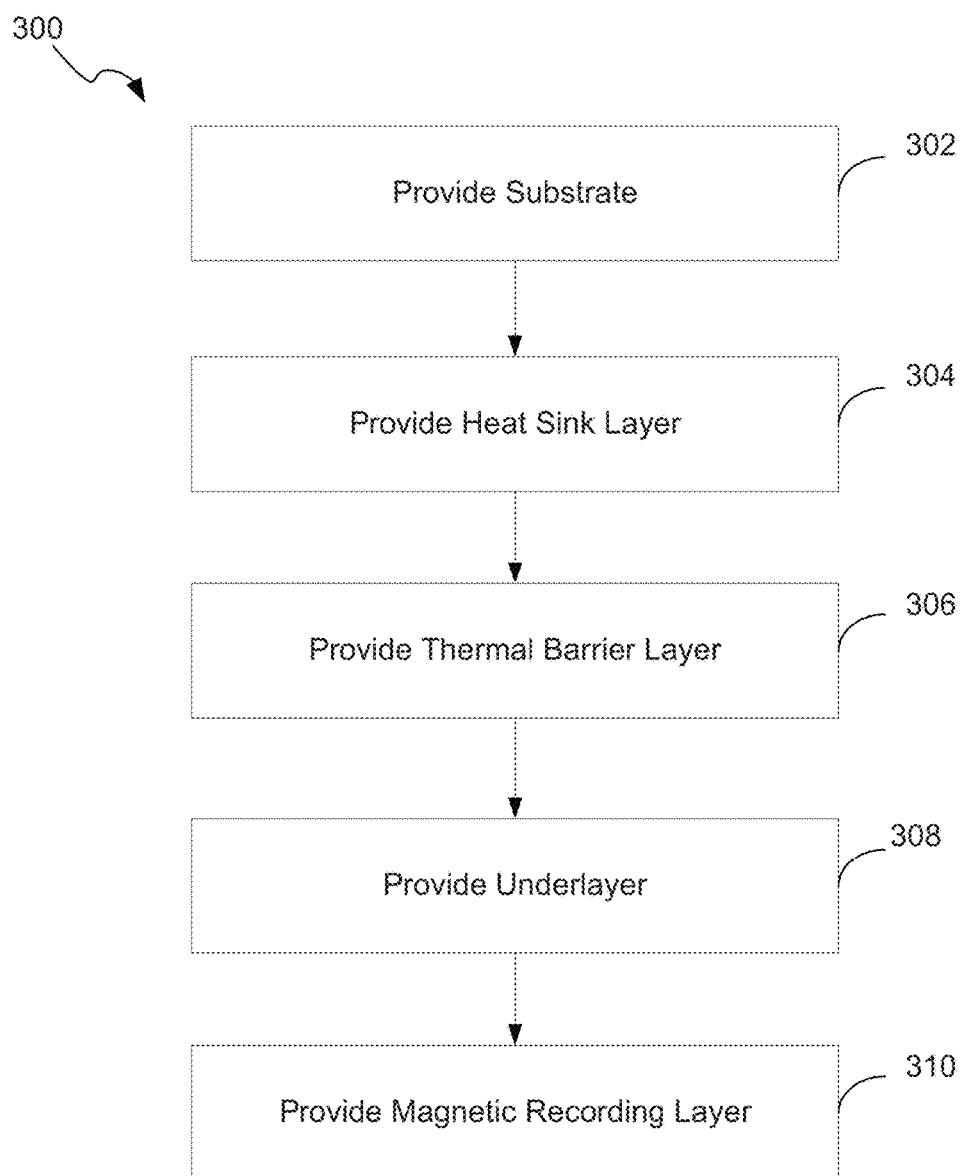
FIG. 6 is a flowchart of a process for manufacturing a HAMR medium including an underlayer and a thermal barrier layer in accordance with one embodiment of the invention.

FIG. 6 is a flowchart of a process 300 for manufacturing a HAMR medium including a thermal barrier layer and underlayer in accordance with one embodiment of the invention. In particular embodiments, the process 300 can be used to manufacture the HAMR magnetic media of FIG. 3, FIG. 2, or FIG. 1. The process first provides a substrate in block 302. The process then provides a heat sink layer on the substrate in block 304. The process then provides a thermal barrier layer of SrTiO$_3$ on the heat sink layer in block 306. The process then provides an underlayer of MgO on the thermal barrier layer in block 308. The process then provides a magnetic recording layer on the underlayer in block 310.

In a number of embodiments, the process can manufacture the layers of the HAMR medium with any of the numerous variations described above for the embodiments of FIGS. 1, 2, and 3. For example, in one such case, the process can also provide an adhesion layer between the substrate and the heat sink layer, a seed layer between the adhesion layer and the heat sink layer, and a carbon overcoat layer on the magnetic recording layer. In several embodiments, the layers can include the materials as are described above.

In some embodiments, the process provides the thermal barrier layer on the heat sink layer by depositing the thermal barrier layer at high temperature using an RF magnetron sputtering process. In one such case, the temperature can be greater than 450° C.

In some embodiments, the process provides the underlayer on the thermal barrier layer by depositing the underlayer at high temperature using an RF magnetron sputtering process. In one such case, the temperature can be greater than 450° C. For example, the thermal barrier layer may be deposited at a temperature greater than 450° C. and the underlayer may be deposited on the thermal barrier layer without cooling the thermal barrier layer.

In some embodiments, the process provides the thermal barrier layer using a static magnet during an RF magnetron sputtering process. In one such case, the in plane magnetic field on the top surface of the target is greater than 300 Gauss.

In one embodiment, the process can perform the sequence of actions in a different order. In another embodiment, the process can skip one or more of the actions. In other embodiments, one or more of the actions are performed simultaneously. In some embodiments, additional actions can be performed.

Figure 7:
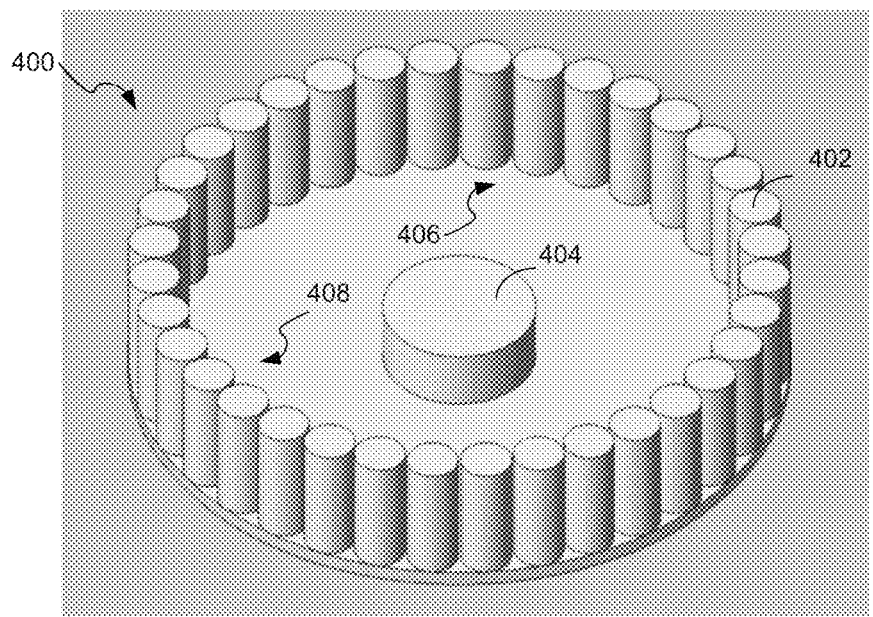
FIG. 7 is a plan view of a static magnet that can be used to manufacture a HAMR medium in accordance with one embodiment of the invention.

FIG. 7 is a plan view of a static magnet 400 that can be used to manufacture a HAMR medium in accordance with one embodiment of the invention. The static magnet 400 has an unbalanced design including a plurality of cylindrical magnets 402 concentrically arranged around a center circular magnet 404. The height of the cylindrical magnets 402 gradually increases around one half of the center magnet 404 and gradually decrease around the other half of the center magnet 404. For example, the cylindrical magnets 402 along one half 406 of the center magnet 404 have greater heights than those of the cylindrical magnets 402 along the other half 408 of the center magnet 404.

Figure 8:
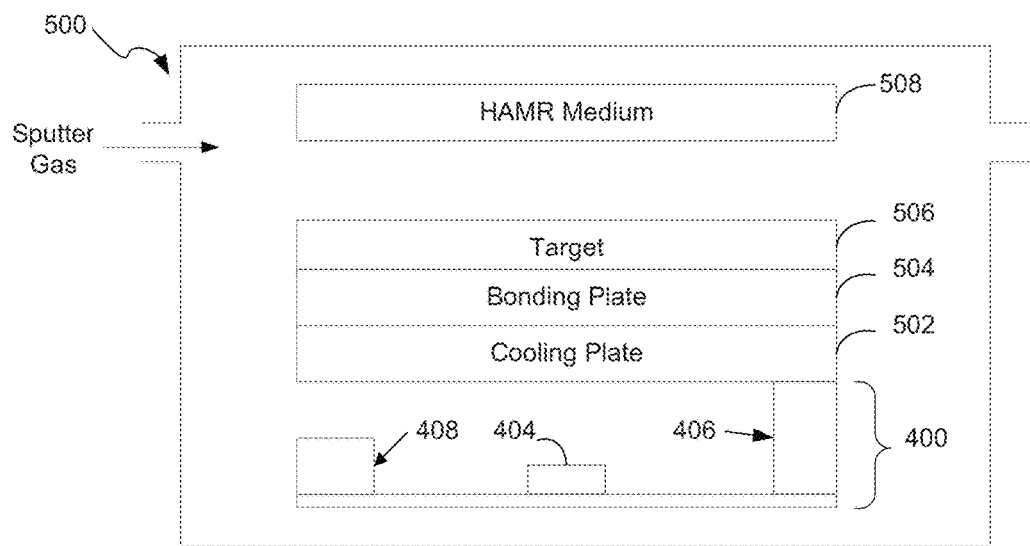
FIG. 8 is a schematic side view of an exemplary deposition chamber including the static magnet of FIG. 7 in accordance with one embodiment of the invention.

FIG. 8 is a schematic side view of an exemplary deposition chamber 500 including the static magnet 400 of FIG. 7 in accordance with one embodiment of the invention. The deposition chamber 500 further includes a cooling plate 502, a bonding plate 504 and a target 506. The target 506 (e.g., sputter target) contains the thermal barrier layer material to be deposited onto a HAMR medium 508 (e.g., substrate) and forms a cathode in the deposition chamber 500, while the HAMR medium 508 forms the anode. In an exemplary embodiment, the in-plane magnetic field on the top surface of the target 506 is greater than 300 Gauss during deposition of the thermal barrier layer.

For a conventional magnetron sputter deposition, rotating a magnet below the target 506 (cathode) during the sputtering process may improve the utilization of the sputter target and uniformity of material deposited from the sputter target (e.g., target 506). However, for ceramic materials, such as SrTiO$_3$, using the static magnet 400 positioned in the manner shown in FIG. 8 may improve the stability of the plasma in the deposition chamber 500 and improve both the film quality and repeatability of the process.

Figure 9:
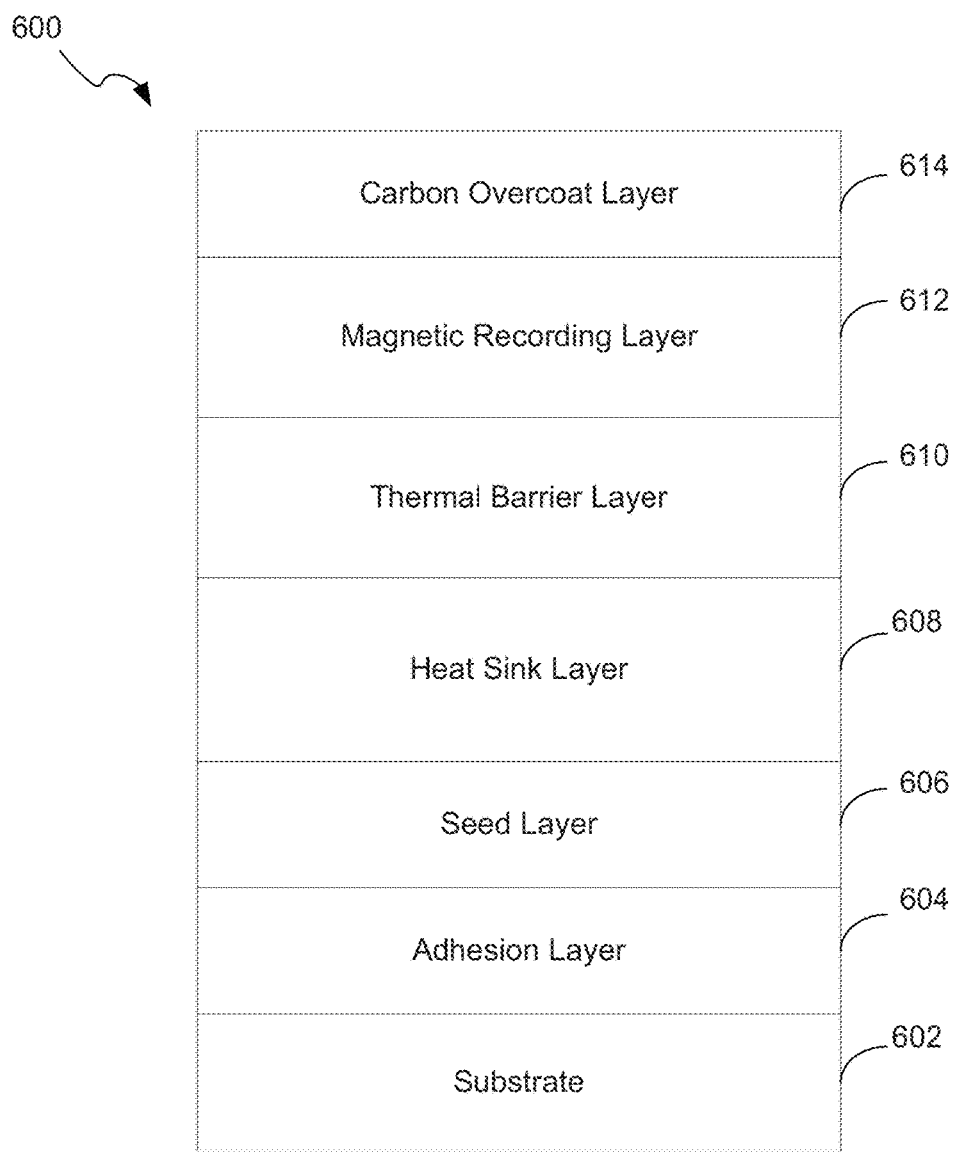
FIG. 9 is a side cross sectional view of a HAMR medium having an underlayer serving as a thermal barrier layer in accordance with one embodiment of the invention.

FIG. 9 is a side cross sectional view of a HAMR medium having an underlayer of an ABO3-type oxide serving as a thermal barrier layer in accordance with one embodiment of the invention. The medium 600 has a stacked structure with a glass substrate 602 at a bottom/base layer, an adhesion layer 604 on the glass substrate 602, a seed layer 606 on the adhesion layer 604, a heat sink layer 608 on the seed layer 606, the thermal barrier layer 610 on the heat sink layer 608, a magnetic recording layer 612 on the thermal barrier layer 610, and a carbon overcoat layer 614 on the magnetic recording layer 612. In some embodiments, the adhesion layer 604, seed layer 606, and carbon overcoat layer 614 can be omitted from the medium structure.

In several embodiments, the thermal conductivity ($\kappa$) of the thermal barrier layer 610 is less than the thermal conductivity of, for example, the MgO underlayer shown in FIG. 3. In one embodiment, in thin film form, the thermal conductivity of the thermal barrier layer 610 is less than 10 W/mK. In another embodiment, the thermal conductivity of the thermal barrier layer 610 is less than 3 W/mK. In an exemplary embodiment, the thermal barrier layer 610 is configured to (e.g., the materials for the first thermal barrier layer are selected to) facilitate a heat transfer from the magnetic recording layer 612 to the heat sink layer 608, and impede a heat transfer from the heat sink layer 608 to the magnetic recording layer 612.

In addition, the thermal barrier layer 610 further functions as a seed layer for the magnetic recording layer 612 to promote growth of a high quality magnetic recording layer 612. In an exemplary embodiment, the thermal barrier layer 610 promoting good $L1_0$ ordering and low RC-FWHM of an FePt magnetic recording layer 612. In one embodiment, the ABO3-type oxide of the thermal barrier layer 610 has a lattice parameter (a) between about 3.8 angstroms and 4.4 angstroms. Such ABO3-type oxides exhibit low thermal conductivity as compared to MgO. In an exemplary embodiment, the ABO3-type oxide can be made of one or more materials such as $BaTiO_3$, $SrTiO_3$, $SrHfO_3$, $SrZrO_3$, $PbTiO_3$ and $BaZrO_3$, combinations thereof, and/or other suitable materials known in the art. The lattice mismatching between such ABO3-type oxides and $L1_0$ phase FePt is similar to MgO, which promotes good $L1_0$ ordering and low RC-FWHM of the FePt magnetic recording layer.

In one embodiment, the substrate 602 can be made of one or more materials such as an Al alloy, NiP plated Al, glass, glass ceramic, and/or combinations thereof. In one embodiment, the adhesion layer 604 can includes one or more materials such as CrTi, CrTa, NiTa, CoCrTaZr, CoFeZrBCr, CoTaZr, CoFeTaZr, CoCrWTaZr, CoCrMoTaZr, CoZrWMo, combinations thereof, and/or other suitable materials known in the art.

In one embodiment, the seed layer 606 can be made of one or more materials such as RuAl, CrTa, NiTa, combinations thereof, and/or other suitable materials known in the art. In one embodiment, the heat sink layer 608 can be made of one or more materials such as Ag, Al, Au, Cu, Cr, Mo, Ru, W, CuZr, MoCu, AgPd, CrRu, CrV, CrW, CrMo, CrNd, combinations thereof, and/or other suitable materials known in the art.

In one embodiment, the magnetic recording layer 612 can be made of one or more materials such as FePt and/or other suitable materials known in the art. In addition, the magnetic recording layer 612 may further include one or more segregants, such as carbon. In an exemplary embodiment, the magnetic recording layer 612 includes $L1_0$ phase FePt.

In several embodiments, the thermal barrier layer 610 has a cubic structure (cubic crystal structure) with (200) texture. In further embodiments, the heat sink layer 608 also has a cubic structure with (200) texture and the lattice mismatching between the heat sink layer 608 and the thermal barrier layer 610 is between about three (3) percent and about eight (8) percent. In an exemplary embodiment, the heat sink layer 608 includes W, Mo, Cr or a Cr-based alloy to achieve the desired lattice mismatching. For example, the heat sink layer 608 may include CrW or CrMo. In addition, in embodiments in which the heat sink layer 608 includes W, Cr and their alloys, a (200) textured heat sink layer 608 may be grown using a seed layer 606 including a textured layer of RuAl over an amorphous layer of CrTa. In embodiments in which the heat sink layer 608 includes Cr and its alloys, a (200) textured heat sink layer 608 may be grown using a seed layer 606 including an amorphous layer of NiTa.

In several embodiments, the thickness of the thermal barrier layer 610 is between about 2 nm and about 11 nm. In an exemplary embodiment, the thickness of the thermal barrier layer 610 is about 3 nm.

Figure 10:
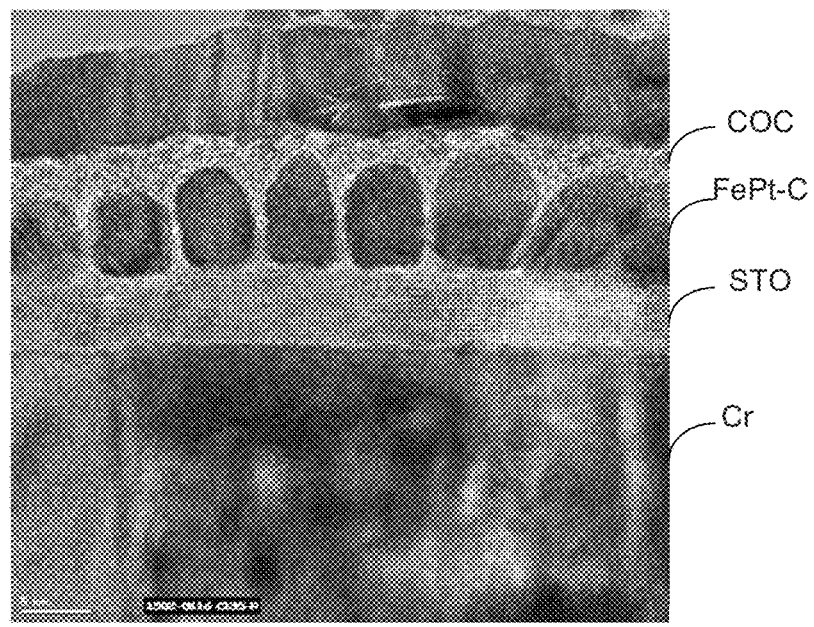
FIG. 10 is side cross sectional transmission electron microscope (TEM) view of a HAMR medium including an underlayer serving as a thermal barrier layer between the magnetic recording layer and the heat sink layer in accordance with one embodiment of the invention.

FIG. 10 is side cross sectional transmission electron microscope (TEM) view of a HAMR medium including an underlayer serving as a thermal barrier layer ($SrTiO_3$) between the magnetic recording layer (FePt—C) and the heat sink layer (Cr) in accordance with one embodiment of the invention. As illustrated, the grains of the magnetic recording layer (FePt—C) are segregated and are similar to FePt—C grown on an MgO underlayer. The carbon overcoat layer is designated as COC.

Figure 11:
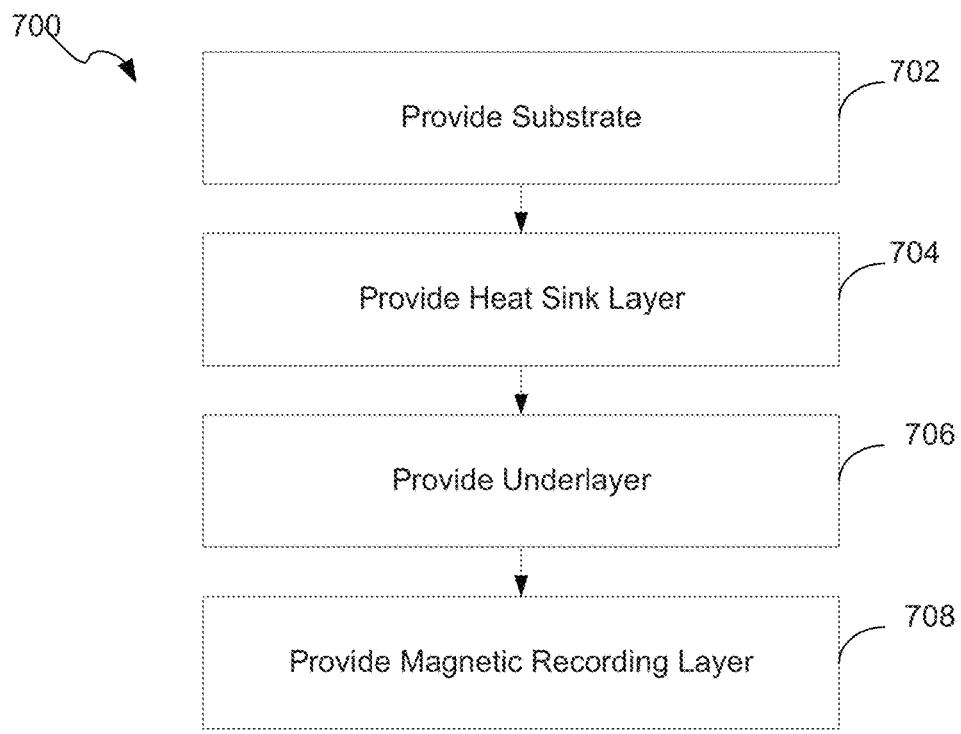
FIG. 11 is a flowchart of a process for manufacturing a HAMR medium including an underlayer serving as a thermal barrier layer in accordance with one embodiment of the invention.

FIG. 11 is a flowchart of a process 700 for manufacturing a HAMR medium including an underlayer serving as a thermal barrier layer in accordance with one embodiment of the invention. In particular embodiments, the process 700 can be used to manufacture the HAMR magnetic media of FIG. 9, FIG. 2, or FIG. 1. The process first provides a substrate in block 702. The process then provides a heat sink layer on the substrate in block 704. The process then provides an underlayer serving as a thermal barrier layer of an ABO3-type oxide on the heat sink layer in block 706. The process then provides a magnetic recording layer on the underlayer in block 708.

In a number of embodiments, the process can manufacture the layers of the HAMR medium with any of the numerous variations described above for the embodiments of FIGS. 1, 2, and 9. For example, in one such case, the process can also provide an adhesion layer between the substrate and the heat sink layer, a seed layer between the adhesion layer and the heat sink layer, and a carbon overcoat layer on the magnetic recording layer. In several embodiments, the layers can include the materials as are described above.

In some embodiments, the process provides the thermal barrier layer on the heat sink layer by depositing the thermal barrier layer at high temperature using an RF magnetron sputtering process. In one such case, the temperature can be greater than 450° C.

In some embodiments, the process provides the thermal barrier layer using a static magnet during an RF magnetron sputtering process. In one such case, the in plane magnetic field on the top surface of the target is greater than 300 Gauss.

In one embodiment, the process can perform the sequence of actions in a different order. In another embodiment, the process can skip one or more of the actions. In other embodiments, one or more of the actions are performed simultaneously. In some embodiments, additional actions can be performed.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

What is claimed is:

1. A medium for heat assisted magnetic recording, the medium comprising:
   a substrate;

a heat sink layer on the substrate;
a thermal barrier layer directly on the heat sink layer, the thermal barrier layer comprising $SrTiO_3$;
an underlayer on the thermal barrier layer, the underlayer comprising MgO; and
a magnetic recording layer on the underlayer,
wherein the heat sink layer is configured to dissipate heat from the magnetic recording layer.

2. The medium of claim 1, wherein the thermal barrier layer has a cubic structure with (200) texture.

3. The medium of claim 2, wherein the heat sink layer has a cubic structure with (200) texture.

4. The medium of claim 3, wherein a lattice mismatch between the heat sink layer and the thermal barrier layer is less than 8 percent.

5. The medium of claim 4, wherein the heat sink layer comprises a Cr-based alloy.

6. The medium of claim 5, wherein the heat sink layer comprises CrW and the magnetic recording layer comprises FePt with a segregant.

7. The medium of claim 2, wherein the underlayer has a cubic structure with (200) texture.

8. The medium of claim 1, wherein a first thickness of the thermal barrier layer is between about 3 nm and about 10 nm and a second thickness of the underlayer is between about 2 nm and about 11 nm.

9. The medium of claim 1, wherein a first thickness of the thermal barrier layer is about 7 nm and a second thickness of the underlayer is about 3 nm.

10. The medium of claim 1, wherein the thermal barrier layer is configured to:
facilitate a heat transfer from the magnetic recording layer to the heat sink layer; and
impede a heat transfer from the heat sink layer to the magnetic recording layer.

11. The medium of claim 1, wherein the thermal barrier layer is deposited at a temperature greater than 450 degrees Celsius using a first radio frequency (RF) magnetron sputtering process and the underlayer is deposited at a temperature greater than 450 degrees Celsius using a second RF magnetron sputtering process.

12. The medium of claim 11, wherein the thermal barrier layer is deposited using a static magnet.

13. A heat assisted magnetic recording system comprising:
the medium of claim 1;
a near-field transducer light source configured to direct light energy on to the medium; and
a magnetic transducer configured to write information to the medium.

14. A method for fabricating a medium for heat assisted magnetic recording, the method comprising:
providing a substrate;
providing a heat sink layer on the substrate;
providing a thermal barrier layer directly on the heat sink layer, the thermal barrier layer comprising $SrTiO_3$;
providing an underlayer on the thermal barrier layer, the underlayer comprising MgO; and
providing a magnetic recording layer on the underlayer,
wherein the heat sink layer is configured to dissipate heat from the magnetic recording layer.

15. The method of claim 14, wherein providing the thermal barrier layer on the heat sink layer comprises:
depositing the thermal barrier layer on the heat sink layer at a temperature greater than 450 degrees Celsius using a first RF magnetron sputtering process.

16. The method of claim 15, wherein providing the underlayer on the thermal barrier layer comprises:
depositing the underlayer at a temperature greater than 450 degrees Celsius using a second RF magnetron sputtering process.

17. The method of claim 16, wherein providing the underlayer on the thermal barrier layer further comprises:
depositing the thermal barrier layer using a static magnet.

18. The method of claim 14, wherein the thermal barrier layer, the underlayer and the heat sink layer each has a cubic structure with (200) texture.

19. The method of claim 14, wherein a lattice mismatch between the heat sink layer and the thermal barrier layer is less than 8 percent.

20. The method of claim 19, wherein the heat sink layer comprises a Cr-based alloy.

21. The method of claim 14, wherein a first thickness of the thermal barrier layer is between 3 nm and 10 nm and a second thickness of the underlayer is between 2 nm and 11 nm.

22. A medium for heat assisted magnetic recording, the medium comprising:
a substrate;
a heat sink layer on the substrate;
a thermal barrier layer directly on the heat sink layer, the thermal barrier layer comprising an ABO3-type oxide; and
a magnetic recording layer on the thermal barrier layer,
wherein the heat sink layer is configured to dissipate heat from the magnetic recording layer.

23. The medium of claim 22, wherein the thermal barrier layer has a cubic structure with (200) texture.

24. The medium of claim 23, wherein the heat sink layer has a cubic structure with (200) texture.

25. The medium of claim 22, wherein the magnetic recording layer comprises FePt with a segregant.

26. The medium of claim 22, wherein a lattice mismatch between the thermal barrier layer and the magnetic recording layer is between about 3 percent and about 8 percent.

27. The medium of claim 22, wherein the ABO3-type oxide is selected from the group consisting of $BaTiO_3$, $SrHfO_3$, $SrZrO_3$, $PbTiO_3$ and $BaZrO_3$.

28. The medium of claim 22, wherein a thermal conductivity of the thermal barrier layer is less than 10 Watts per meter Kelvin.

29. The medium of claim 22, wherein the thermal barrier layer is configured to:
facilitate a heat transfer from the magnetic recording layer to the heat sink layer; and
impede a heat transfer from the heat sink layer to the magnetic recording layer.

30. A heat assisted magnetic recording system comprising:
the medium of claim 22;
a near-field transducer light source configured to direct light energy on to the medium; and
a magnetic transducer configured to write information to the medium.

31. A method for fabricating a medium for heat assisted magnetic recording, the method comprising:
providing a substrate;
providing a heat sink layer on the substrate;
providing a thermal barrier layer directly on the heat sink layer, the thermal barrier layer comprising an ABO3-type oxide; and
providing a magnetic recording layer on the thermal barrier layer, wherein the heat sink layer is configured to dissipate heat from the magnetic recording layer.

32. The method of claim 31, wherein the thermal barrier layer and the heat sink layer each has a cubic structure with (200) texture.

33. The method of claim 31, wherein the ABO3-type oxide is selected from the group consisting of $BaTiO_3$, $SrHfO_3$, $SrZrO_3$, $PbTiO_3$ and $BaZrO_3$.

34. The method of claim 31, wherein a thermal conductivity of the thermal barrier layer is less than 10 Watts per meter Kelvin.

* * * * *